US007012244B2

(12) United States Patent
Huff

(10) Patent No.: US 7,012,244 B2
(45) Date of Patent: Mar. 14, 2006

(54) APPARATUS FOR MONITORING OR CONTROLLING THE FLOW OF PERSONS THROUGH A GANGWAY

(75) Inventor: Derek Huff, Claygate (GB)

(73) Assignee: Integrated Design Limited, Ashford (GB)

( * ) Notice: Subject to any disclaimer, the term of this patent is extended or adjusted under 35 U.S.C. 154(b) by 46 days.

(21) Appl. No.: 10/683,802

(22) Filed: Oct. 9, 2003

(65) Prior Publication Data

US 2004/0135072 A1 Jul. 15, 2004

Related U.S. Application Data

(63) Continuation of application No. 09/830,100, filed as application No. PCT/GB99/03455 on Oct. 19, 1999, now abandoned.

(30) Foreign Application Priority Data

Oct. 23, 1998 (GB) ............................................ 9823186

(51) Int. Cl.
*G01J 1/04* (2006.01)
*G01J 1/42* (2006.01)
*G01J 5/08* (2006.01)

(52) U.S. Cl. ...................................... 250/227.11; 49/46

(58) Field of Classification Search ............ 250/227.11, 250/227.31, 227.22, 227.24, 227.28, 227.29, 250/221, 208.1, 224, 222.1; 340/556, 555, 340/540, 551; 49/25, 42, 46
See application file for complete search history.

(56) References Cited

U.S. PATENT DOCUMENTS

| | | | |
|---|---|---|---|
| 5,191,219 | A | 3/1993 | Linke |
| 5,233,185 | A | 8/1993 | Whitaker |
| 5,524,460 | A | 6/1996 | Michetti et al. |
| 5,831,529 | A | 11/1998 | Pantus |
| 5,845,692 | A | 12/1998 | Kellem et al. |
| 6,012,252 | A | 1/2000 | Kocznar et al. |

*Primary Examiner*—David Porta
*Assistant Examiner*—Seung C. Sohn
(74) *Attorney, Agent, or Firm*—Christie, Parker and Hale, LLP

(57) ABSTRACT

A detection system is disclosed comprising one or more transmitters of electromagnetic radiation and one or more cooperating receivers characterized in that at least one optical element is provided which utilizes total internal reflection to redirect the path of radiation such that the transmitter is not directly in line with the receiver.

18 Claims, 3 Drawing Sheets

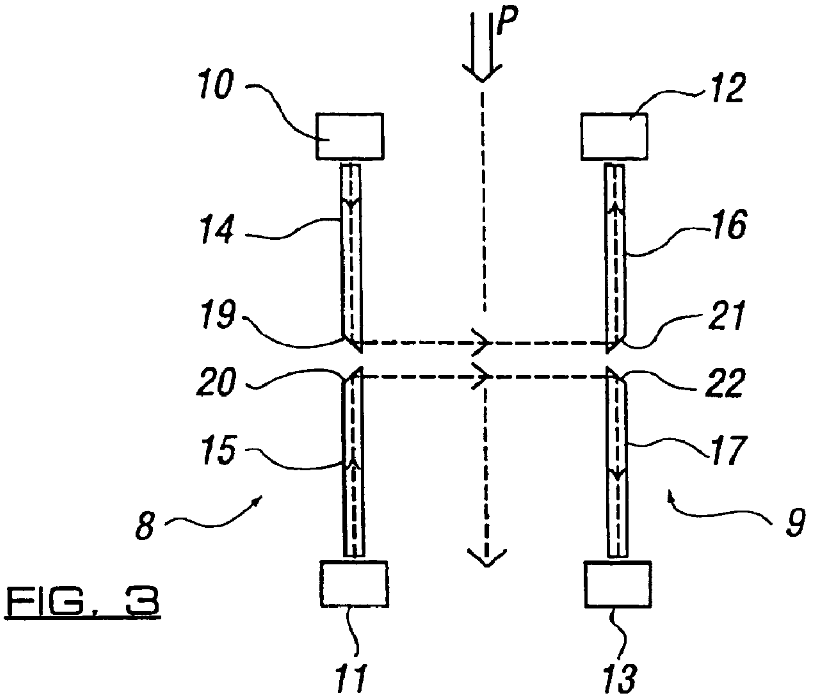
FIG. 3
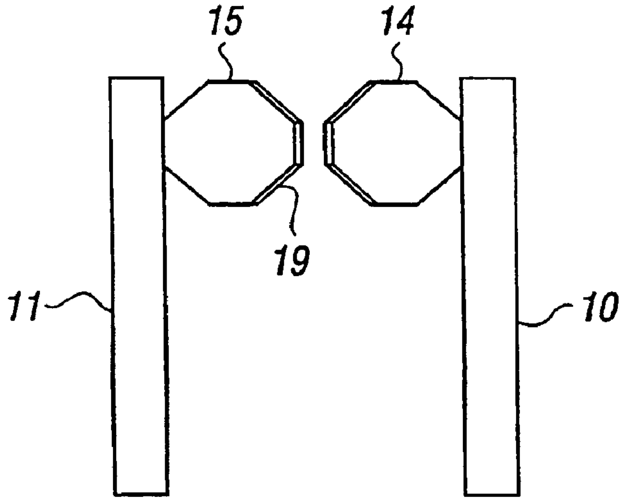
FIG. 4
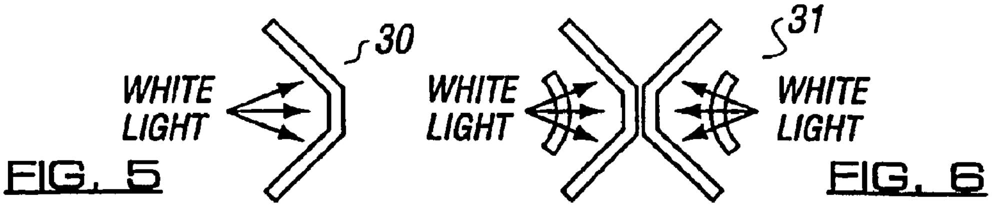
FIG. 5
FIG. 6

APPARATUS FOR MONITORING OR CONTROLLING THE FLOW OF PERSONS THROUGH A GANGWAY

CROSS-REFERENCE TO RELATED APPLICATION(S)

This application is a continuation of U.S. application Ser. No. 09/830,100, filed Jul. 23, 2001, ABN which claims priority of International application number PCT/GB99/03455, filed Oct. 19, 1999, which in turn claims priority to British patent application number 9823186.3, filed Oct. 23, 1998.

BACKGROUND OF THE INVENTION

This invention relates to detection systems. In particular, but not exclusively, it relates to detection systems of the type which use light beams, such as infrared beams, in order to sense the position, or the passage of an object.

Systems using infrared or other parts of the electromagnetic spectrum for sensing the position of objects are quite common. These generally comprise one or more transmitting devices and co-operating receiving devices so that, in the simplest aspect, an infrared beam crosses a path and, if the beam is broken, the system recognizes it and therefore senses that a person or object has crossed the path. Systems of this type may be used to control entry to or from a place, for intruder alarms; or for many other purposes.

In many situations where light beams are used to sense the position of an object, it is not convenient to have the transmitting and receiving devices in line with the beam path. This may be for aesthetic, physical or environmental reasons for example. For instance, conventional access systems, known as optical turnstiles, comprise two relatively large bodies, one of them including an array of infrared transmitters and the other having an array of infrared receivers, and each being provided with electronics, control logic, etc. A person has to pass between them. Since these bodies contain electronics and detection circuitry within a metal or plastics shell, they are bulky and very visible. In environments where aesthetics are important, they are obtrusive and unwelcome.

SUMMARY OF THE INVENTION

It is one object of the present invention to provide an improved access system of this type, which is more inconspicuous and/or aesthetically attractive.

According to the present invention there is provided an access control or monitoring system comprising one or more transmitters of electromagnetic radiation and one or more co-operating receivers for detecting the presence or absence of transmitted radiation, characterized in that at least one optical element is provided which redirects the path of radiation such that the transmitter is not directly in line with the receiver.

Preferably, total internal reflection is used to redirect the radiation.

Preferably, the optical element comprises a sheet of a generally transparent plastics material (eg Perspex), having one edge adjacent to the transmitter and an opposite edge, to which the light from the transmitter passes through the sheet, being angled at a greater angle than the critical angle of the material such that light is reflected at that edge so as to be redirected.

Preferably, the apparatus has at least one array of transmitters having one or more beam redirection elements such that radiation is redirected by the redirection element substantially perpendicular to the normal path through which a person crosses the apparatus.

The invention enables the infrared transmitters, or other radiators, to be positioned well out of the way and their beams to be taken to a convenient place for passage across the path of a user by plastics sheets or other optical redirection means, which are substantially transparent when viewed normally and thus which present a better appearance to the user. The sheets are preferably of Perspex but may be of many other materials, such as other plastics materials, glass, etc.

In accordance with the invention in a further aspect there is provided a light redirection device for an access control system, comprising a body of material having an edge at an angle greater than the critical angle of the material, against which light may impinge.

According to the invention in a further aspect there is provided a method for imaging fingerprints, comprising; placing a fingertip against a surface of a body of material, the surface being at an angle greater than the critical angle of the material, with respect to an axis of the body; and viewing the fingerprint through the body.

In a further aspect, the invention provides a detection system comprising one or more transmitters of electromagnetic radiation and one or more co-operating receivers, characterized in that at least one optical element is provided which utilizes total internal reflection to redirect the path of radiation such that the transmitter is not directly in line with the receiver.

In a yet further aspect, the invention provides an access control or monitoring apparatus having at least one array of transmitters adjacent to one or more beam redirection elements such that radiation is redirected by each redirection element across the normal path through which a person crosses the apparatus.

BRIEF DESCRIPTION OF THE DRAWINGS

Embodiments of the invention will now be described, by way of example only, with reference to the accompanying schematic drawings, in which:

FIG. 3 shows a plan view of an access system;

FIG. 4 shows a side view of one of the elements of an access system;

FIG. 5 shows a display;

FIG. 6 shows an alternative display

DETAILED DESCRIPTION OF ILLUSTRATIVE EMBODIMENTS OF THE INVENTION

Figure 1:
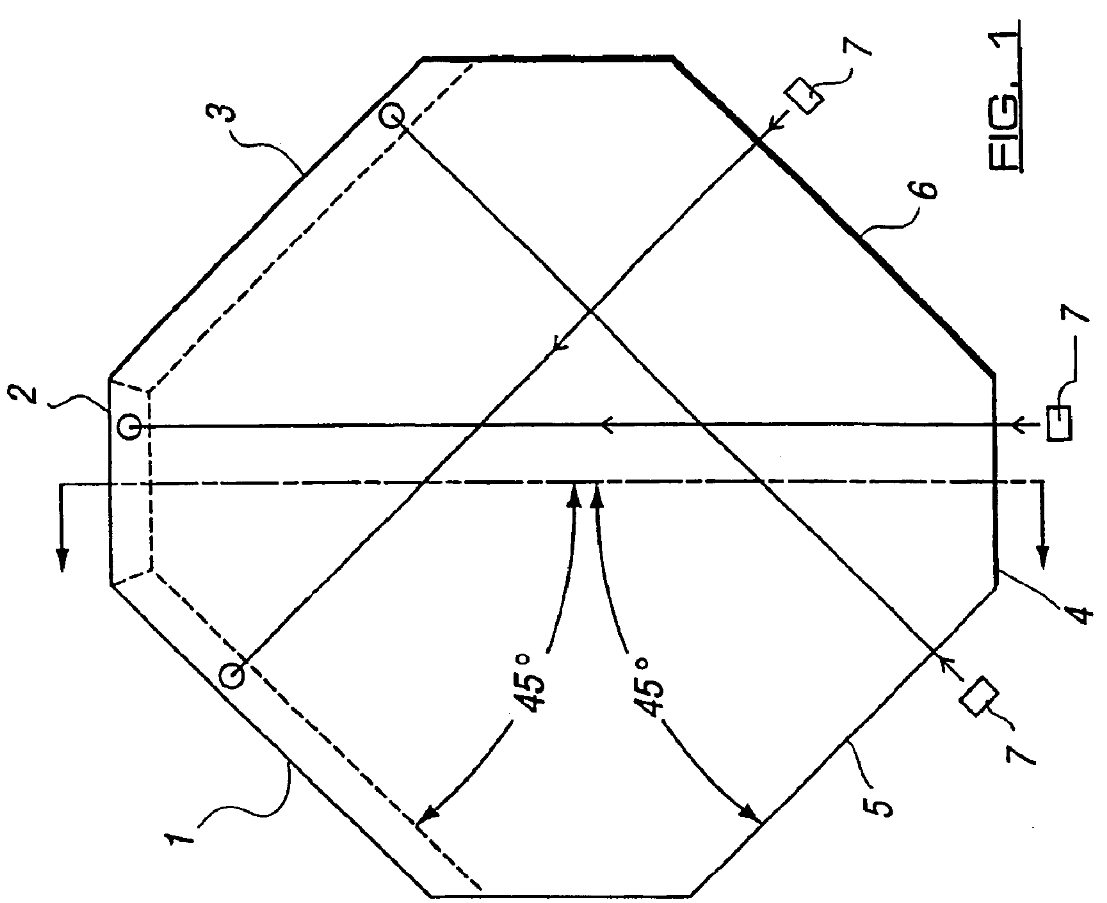
FIG. 1 shows an optical element.

The present invention arose in an attempt to develop an improved access control system in which optical means are used to detect the passage of persons entering or leaving an environment such as a building or stadium for example, rather than using the conventional method of turnstiles. The present invention allows an array of infrared transmitters to be placed discreetly where they are not easily viewed directly and for their transmitted infrared beams to be directed by an optical redirecting element across the path through which persons are required to travel. One such optical redirectional element is shown in FIGS. 1 and 2.

The element is most preferably made of a generally transparent material of plastics or glass for example, which has a suitable reflective index and thereby critical angle relative to air. As shown, in one embodiment the element comprises a flat octagonal sheet, the edges being of two different lengths. The sheet may be of any desired shape and the particular shape shown is one that was chosen for a specific purpose which also presents an interesting and useful effect when illuminated with white light, as described further below. Three of the edges 1, 2 and 3 are formed (eg cut) at an angle of 45° relative to the major faces. The remaining edges are formed to be perpendicular to the major faces. In one embodiment, the sheet is made of Perspex which has a critical angle of just less than 45°. The effect of this is that any light which is incident upon one of the angle edges of the element from an opposed 'plain' edge, and is thereby in a generally parallel line to the major faces of the element, is reflected by the angled face and emerges from the element at a different angle. This is shown more clearly in FIG. 2 where light is caused to enter through edge 4 (directly opposite to edge 2) and to pass through the element to edge 2. It impinges upon edge 2 and is reflected outwards (to the right in the figure). Thus, if an infrared transmitter is arranged adjacent to edge 4, the light therefrom will be emitted from edge 2 in a direction out of plane of the figure. Similarly, light entering edge 5 will be emitted from edge 3 and light entering edge 6 will be emitted from edge 1.

Figure 2:
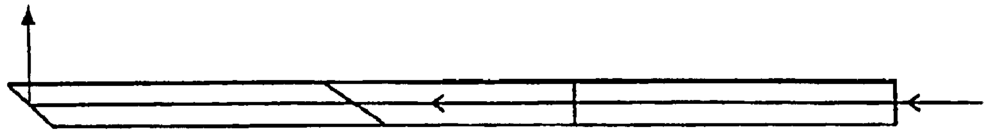
FIG. 2 shows a cross-section through the element of FIG. 1.

Accordingly, if a person is walking past a device as shown in FIGS. 1 and 2, the light from an infrared transmitter will appear to emanate from one of the edges 2, 3 or 1 which may be disposed some distance from the actual infrared transmitters 7. The transmitters can thereby be placed in shielded areas where they are substantially unviewable and their light taken substantially transparently through an element to a desired position. The sheet acts as a light pipe for the transmission of the light and therefore the sheet still appears to be transparent to the person walking past it, other than a beam emitted from the respective one of the edges 1, 2 or 3.

FIG. 3 shows how the effect may be embodied in practice. A passageway is formed between a transmitting and receiving body 8 and 9 respectively. Each of these comprises a pair of columns 10, 11, 12 and 13 which may be approximately the height of a human being or less or more than this and which enclose control electronics and respective arrays of infrared transmitters and/or receivers. One or more optical elements as shown in FIGS. 1 and 2 are positioned adjacent to the columns such that respective infrared transmitters of column 10 and 11 for example are arranged to provide light input into one of the edges 4, 5 or 6 of an element. Similarly, infrared detectors are arranged to receive outputs from appropriate edges of the elements 16 and 17.

FIG. 4 shows a side view of the transmitter assembly 8. The receiver assembly 9 may be similar. Although only one pair of light conductive elements 14 and 15 are shown in FIG. 4, it will be appreciated that more elements may be provided, spaced vertically up the length of columns 10 or 11.

As shown by the dashed lines in the figure, the respective light elements 14 and 15 direct light from the substantially hidden array of infrared transmitters to their angled faces 19, 20 and then re-direct them across the path P through which a person is constrained to walk. Similarly, the angled faces 21 and 22 of respective elements 16 and 17 serve to redirect the received beams to receivers within columns 12 and 13.

A person who is traveling along path P breaks various ones of the beam paths. This is used, in a known manner, which does not form part of the invention, to detect the presence of that person. By using arrays of elements and control logic, and/or software, it is possible to differentiate between different types of object, or to ensure that only one person passes the apparatus at any time (perhaps in conjunction with an identity reader such as a smart card reader such that when a person's identify has been verified only one person is allowed to pass through, other people may not "tailgate" with him). Many other functions may be used with the system.

Although infrared transmission is preferred, the terms light transmission and electromagnetic transmission are used herein and these are intended to encompass infrared and other types of light or radiation within the electromagnetic spectrum. The concepts of the invention may be used with other systems than person detection systems, such as the detection of other types of objects and the redirecting element need not necessarily be a flat sheet but may be of any suitable shape. It is only required that it has an angle at an appropriate face which is greater than the critical angle of the particular substance so as to induce total internal reflection when light at an appropriate angle is instant upon that face. Polycarbonate may be used (critical angle 39°) or many other types of plastic, glass or other materials. For some embodiments, the directing element need not be one which is generally transparent.

One property of elements of the shape shown in FIGS. 1 and 2, or any other elements having angle faces greater than the critical angle, is that when light (such as white light) is shone through one or more of the perpendicular faces (4, 5 and 6 for example in FIG. 1) then the angled faces 1, 2 and 3 tend to glow since the light is emitted from them.

This effect can be used to advantage. By suitably shaping the redirecting element a desired shape can be illuminated. In the examples shown, shape 30 is achieved (edges 1, 2 and 3—FIG. 1). Accordingly, in an embodiment of the invention, when a person has been allowed access (eg by authorization through a smart card, fingerprint recognition, etc), a source of white light is applied through elements 14 and 16—causing a chevron to be displayed indicating that the person is authorized and also indicating the direction in which he must pass. The elements also pass the infrared transmission as usual to detect the actual passage of the person.

By applying filtering or other means, different colors may be obtained, to indicate different conditions. Also, as two elements 'edge to edge' are provided in FIG. 4 for example, by illuminating both of these as appropriate "X" shape is produced (FIG. 6). This indicates that the person is not authorized and can be used to alert security staff. Preferably, a different color, eg red, is used, by using filters 31 to emphasize the effects. Many other shapes may be achieved by appropriate shaping of the redirecting elements.

Figure 7:
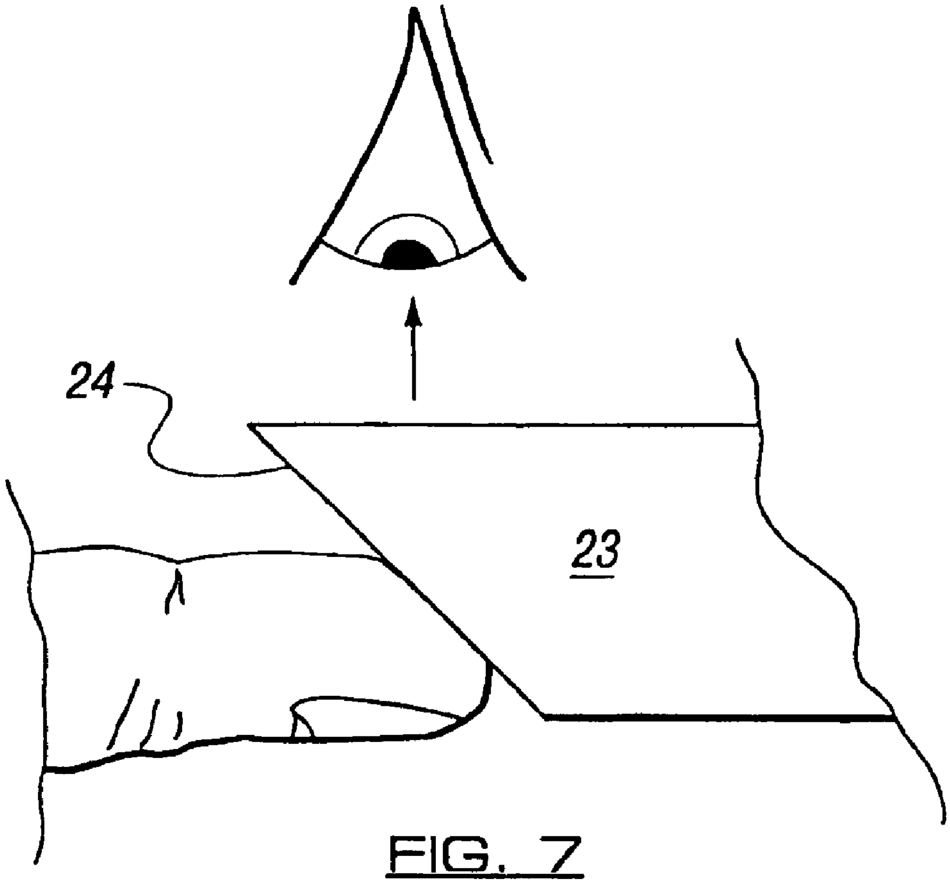
FIG. 7 is an explanatory drawing illustrating a technique for viewing fingerprints.
Figure 8:
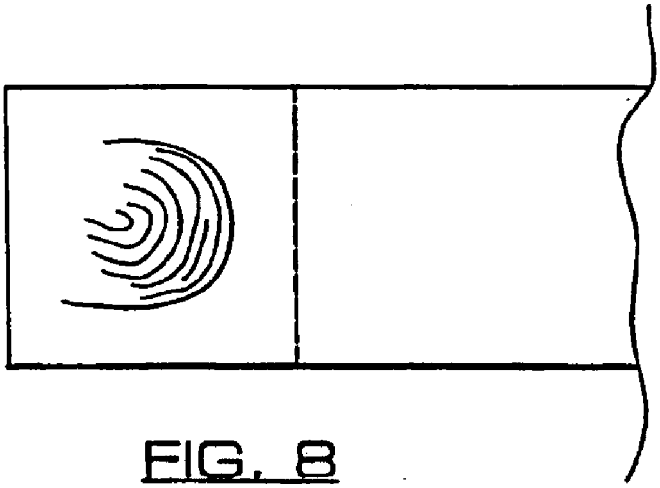
FIG. 8 shows the fingerprint as viewed by the technique of FIG. 7.

FIGS. 7 and 8 show one further application of the critical angle technique. In FIG. 7, an element of a plastics or other material is shown which has a face cut at an angle greater than the critical angle of that material (eg the material 23 may be Perspex in which case an angle of 45° may be suitable, being greater than the critical angle). By placing a fingertip next to the angled face 24, the pressure of the finger serves to break the critical angle effect where it contacts the face. It has been found that when the material is viewed from above a very clear representation of the fingerprint on that fingertip is seen with a very high contrast such that the various ridges, troughs, etc of the fingerprint are clearly observed. Accordingly, by electronically scanning this image, or otherwise, a clear representation of a person's fingerprint may be obtained which can then be processed to form part of a fingerprint recognition system.

Embodiments of the invention may alternatively or additionally be used for access monitoring, for example they can be equipped with means for counting persons (or articles) passing through a space.

In other embodiments, means such as reflectors (eg silvered or mirrored surfaces) may be used, to redirect radiation, so that the transmitters and/or receivers need not be in line with one another.

What is claimed is:

1. An optical turnstile apparatus for monitoring or controlling the flow of persons through a gangway, comprising:

a radiation transmitter optically connected to an edge of a first planar optical guide element;

a radiation receiver optically connected to an edge of a second planar optical guide element;

wherein, the first and second planar optical guide elements are displaced respectively from each other, so as to delimit a gangway through which access may be obtained, the gangway being of suitable size for a person to walk through it; and wherein, an edge of the first planar optical guide element distal from the radiation transmitter is adapted to redirect radiation towards an edge of the second planar optical guide element distal from the radiation receiver, which in turn is adapted to redirect radiation towards the radiation receiver, thereby enabling a transmitted beam of radiation to traverse the intervening gangway and terminate at the radiation receiver;

the optical turnstile further comprising means for detecting a break in the transmitted beam.

2. An optical turnstile apparatus as claimed in claim 1, wherein the optical guide elements use total internal reflection to redirect a path of the radiation.

3. An optical turnstile apparatus as claimed in claim 2, wherein the optical guide elements are of generally transparent material.

4. An optical turnstile apparatus as claimed in claim 3, wherein at least one of said optical guide elements has one edge adjacent to the radiation transmitter and an opposite edge, to which the radiation from the radiation transmitter passes through the optical guide element, which is angled at a greater angle than the critical angle of material from which the optical guide element is made, taking into account the radiation emitted by the radiation transmitter such that radiation is reflected at said opposite edge so as to be redirected.

5. An optical turnstile apparatus as claimed in claim 3 or claim 4, wherein at least one optical guide element has one edge adjacent to at least one radiation receiver and an opposite edge, positioned to receive radiation transmitted by the radiation transmitter and which is angled to redirect the received radiation towards said radiation receiver.

6. An optical turnstile apparatus as claimed in claim 1, having at least one array of radiation transmitters adjacent to one or more optical guide elements such that radiation is redirected by each optical guide element across a path through which a person crosses the apparatus.

7. An optical turnstile apparatus as claimed in claim 1, comprising arrays of transmitters and redirection elements arranged on either side of a central passageway through which a person traverses, the beams being directed across the passageway by the redirection elements.

8. An optical turnstile apparatus as claimed in claim 1, wherein the radiation is infrared radiation.

9. An optical turnstile apparatus as claimed in claim 1, wherein the radiation includes optical radiation, whereby the optical radiation is selectively caused to be emitted from an edge of the first optical guide element.

10. An optical turnstile apparatus as claimed in claim 9, wherein the edge of the optical guide element is shaped to cause the optical radiation to be emitted in a predetermined shape.

11. An optical turnstile apparatus as claimed in claim 1, wherein the edge of the first planar optical guide element distal from the radiation transmitter comprises an angle of substantially 45 degrees relative to at least one major face of the first planar optical guide, and the edge of the second planar optical guide element distal from the radiation receiver comprises an angle of substantially 45 degrees relative to at least one major face of the second planar optical guide.

12. An optical turnstile apparatus as claimed in claim 1, wherein the first and second planar optical guide elements delimit opposite sides of a gangway and are spaced a sufficient distance apart such that an entire person may pass between the first and second planar optical guide elements.

13. An optical turnstile apparatus as claimed in claim 1, wherein the first and second planar optical guide elements are displaced respectively from each other so as to delimit a gangway through which a person may walk from a start position, where the person's whole body is behind respective first ends of the first and second planar optical guide elements, to a second position, where the person's whole body is wholly in front of respective second ends of the first and second planar optical guide elements.

14. An optical turnstile for monitoring or controlling the flow of persons through a passageway, comprising:

a transmitter;

a receiver; and optical guides comprising sheets of a transparent optically conductive material, wherein the optical guides convey radiation from the transmitter, across a passageway delimited at least partially by the guides, to the receiver, the passageway being of suitable size for a person to walk through it.

15. An optical turnstile as claimed in claim 14, wherein the optical guides use total internal reflection to redirect radiation across the passageway.

16. A method of monitoring or controlling the flow of persons through a gangway, comprising:

directing a beam of radiation along a boundary of the gangway via a first rigid optical guide from a remote transmitter;

redirecting the beam of radiation across a transverse extent of the gangway at an end of the first optical guide distal from the transmitter;

receiving the beam of radiation, at an end of a second optical guide distal from a remote receiver;

redirecting the beam of radiation along an opposite boundary of the gangway via the second optical guide to the remote receiver;

monitoring for breaks in the beam of radiation; and wherein the gangway is delimited by the rigid optical guides, which are blocks of optically conductive material, the gangway being of suitable size for a person to walk through it.

17. A method as claimed in claim 16, wherein the optical guides cause redirection of the beam of radiation by total internal reflection.

18. A method as claimed in claim 11 or 17, wherein the optical guides are substantially transparent.

* * * * *